United States Patent [19]
Fleischer et al.

[11] 3,874,743
[45] Apr. 1, 1975

[54] BRAKE ANTILOCK SYSTEM WITH MONITOR CIRCUITRY

[75] Inventors: Helmut Fleischer, Schwieberdingen; Eberhard Schnaibel, Hemmingen, both of Germany

[73] Assignee: Robert Bosch G.m.b.H., Stuttgart, Germany

[22] Filed: Oct. 11, 1973

[21] Appl. No.: 405,555

[30] Foreign Application Priority Data
Nov. 3, 1972 Germany.......................... 2253867

[52] U.S. Cl. .......................... 303/21 AF, 340/52 B
[51] Int. Cl. .............................................. B60t 8/08
[58] Field of Search .............. 180/82 R; 303/21 AF; 307/10 R; 317/31, 148.5 R; 324/51; 340/52 R, 52 B, 248 B, 248 C, 253 B, 253 C

[56] References Cited
UNITED STATES PATENTS

| | | | |
|---|---|---|---|
| 3,602,554 | 8/1971 | Ichimura et al. ................ | 303/21 AF |
| 3,614,734 | 10/1971 | Davis ............................. | 340/248 B X |
| 3,680,923 | 8/1972 | Peterson et al. ................. | 303/21 AF |
| 3,744,851 | 7/1973 | Burckhardt et al. ........... | 303/21 AF X |
| 3,759,582 | 9/1973 | Ohta et al. ..................... | 303/21 AF |

*Primary Examiner*—Trygve M. Blix
*Assistant Examiner*—Stephen G. Kunin
*Attorney, Agent, or Firm*—Flynn & Frishauf

[57] ABSTRACT

To supervise and monitor proper operation of the various systems and components of a vehicle brake antilock system, trouble signals are generated by separate sensing apparatus which sense, respectively, persistence of signals which should terminate, deviation of wave shape of signals from predetermined wave shapes, such as averaged wave shapes derived from various antilock systems associated with predetermined wheels or axles, presence or absence of signals at certain points, and proper power supply; these malfunction signals are then logically combined with brake operating signals, derived from the brake light switch, to disconnect all, or part of the antilock systems, immediately, or upon termination of braking in case of sensed malfunction.

46 Claims, 10 Drawing Figures ived for the rear axle. If known monitor or control systems, which monitor or control the operation of all the antilock systems are used, and trouble should arise, all antilock systems will be disconnected simultaneously. If the trouble arises during braking, all wheels will lock immediately. This will probably result in a skid, unless the vehicle operator is skilled, reacts promptly, and immediately releases the brake.

BRAKE ANTILOCK SYSTEM WITH MONITOR CIRCUITRY

CROSS REFERENCE TO RELATED APPLICATIONS

U.S. Ser. No. 288,791, Sept. 13, 1972; U.S. Ser. No. 325,569, Jan. 22, 1973, now U.S. Pat. No. 3,820,857; U.S. Ser. No. 328,047, Jan. 30, 1973, now U.S. Pat. No. 3,833,270; U.S. Ser. No. 330,674, Feb. 8, 1973, now U.S. Pat. No. 3,829,168. U.S. Ser. No. 395,306, filed Sept. 7, 1973, SCHNAIBEL et al., all assigned to the assignee of the present application.

The present invention relates to a monitor circuit for vehicle wheel brake antilock systems in which electromagnetically operated valves are provided to control application of pressurized brake fluid to vehicle wheel brakes.

Various types of wheel brake antilock systems included a storage element, typically a storage capacitor which is used in a supervisory circuit to interrupt energization of the valves included in the antilock system if the valves are operated for an excessive period of time. Monitor circuits have been proposed in which two magnetic valves are provided (or a single valve having two control paths), one of the valves controlling the application of pressurized brake fluid to a wheel brake cylinder and the other controlling drainage of pressurized brake fluid from the wheel brake cylinder. The control windings of the magnetic valves are connected over an OR gate with a storage capacitor which is slowly charged when at least one of these magnet windings is energized. Upon de-energization of both magnet windings, the storage capacitor is discharged. A threshold switch is connected to the storage capacitor which responds at a predetermined charge level of the storage capacitor, which is the case, when one of the valves is operated for an excessive period of time, thus either interrupting application of pressurized brake fluid to the valve for too long, or draining pressurized brake fluid for an excessive period of time from the wheel brake cylinder.

Vehicle wheel antilock systems are usually so designed that fluid braking pressure rises when both magnet valves are not energized If one of the magnet valves is energized for an excessive period of time, or, worse, continuously, then braking pressure cannot be increased, and the brake will no longer function properly. The threshold switch connected to the storage capacitor will respond in such a case and completely disconnect the magnetic valves. This ensures that the brake operates at least under control of the vehicle operator, but without the protective antilock system.

The situation may arise that trouble arises in the antilock system during braking of the vehicle. Sudden disconnection of the antilock system will then lead to locking of a vehicle wheel due to the resulting rapid pressure rise. Locking of the wheel substantially decreases the braking effort which can be transmitted between wheel and road surface and, further, the lateral guidance or steering capability of the vehicle drops steeply. This difficulty becomes particularly pronounced if the vehicle has a group of autonomously operating antilock systems. In ordinary design, each vehicle wheel has a separately functioning wheel antilock system. It is, however, also possible to supply a four-wheel vehicle with only three systems, one for each front wheel and one for both of the rear wheels, acting on the rear axle. If known monitor or control systems, which monitor or control the operation of all the antilock systems are used, and trouble should arise, all antilock systems will be disconnected simultaneously. If the trouble arises during braking, all wheels will lock immediately. This will probably result in a skid, unless the vehicle operator is skilled, reacts promptly, and immediately releases the brake.

It is an object of the present invention to provide a wheel brake antilock supervisory system which can be utilized to supervise various autonomous, individual antilock control systems, associated with individual wheels or axles, and which is so constructed that upon trouble in any one of the individual antilock systems, locking of all wheels is inhibited.

SUBJECT MATTER OF THE PRESENT INVENTION

Briefly, each one of the individual antilock systems of a vehicle has a separate storage element to store a signal representative of the time that the system is operating. The storage element is connected to a common logical connection circuit which is so connected that the brake disconnecting signal is transmitted to all the antilock systems only after braking has been terminated. The logical connection circuit is controlled with one input from all the storage elements of the individual, autonomous wheel antilock circuits and controlled further, for example with a second input, from the brake light switch. If trouble arises during braking, all antilock systems continue to operate. Only that particular antilock system in which the trouble arose will control the brake of the particular wheel to an erroneous braking effort, usually to braking pressure which is too low. Thus, braking effort is decreased at only one wheel (or axle), and steering, that is, maintenance of attitude of the vehicle is fully maintained. This substantially increases the safety of the system, and safety in driving and steering. It has been found that systems in which all wheels tend to lock, for example due to trouble in the antilock system of any one particular wheel, causes sudden and practically uncontrollable decrease both in braking effort of the entire vehicle, as well as steering capability.

The invention will be described by way of example with reference to the accompanying drawings, wherein.

Figure 1:
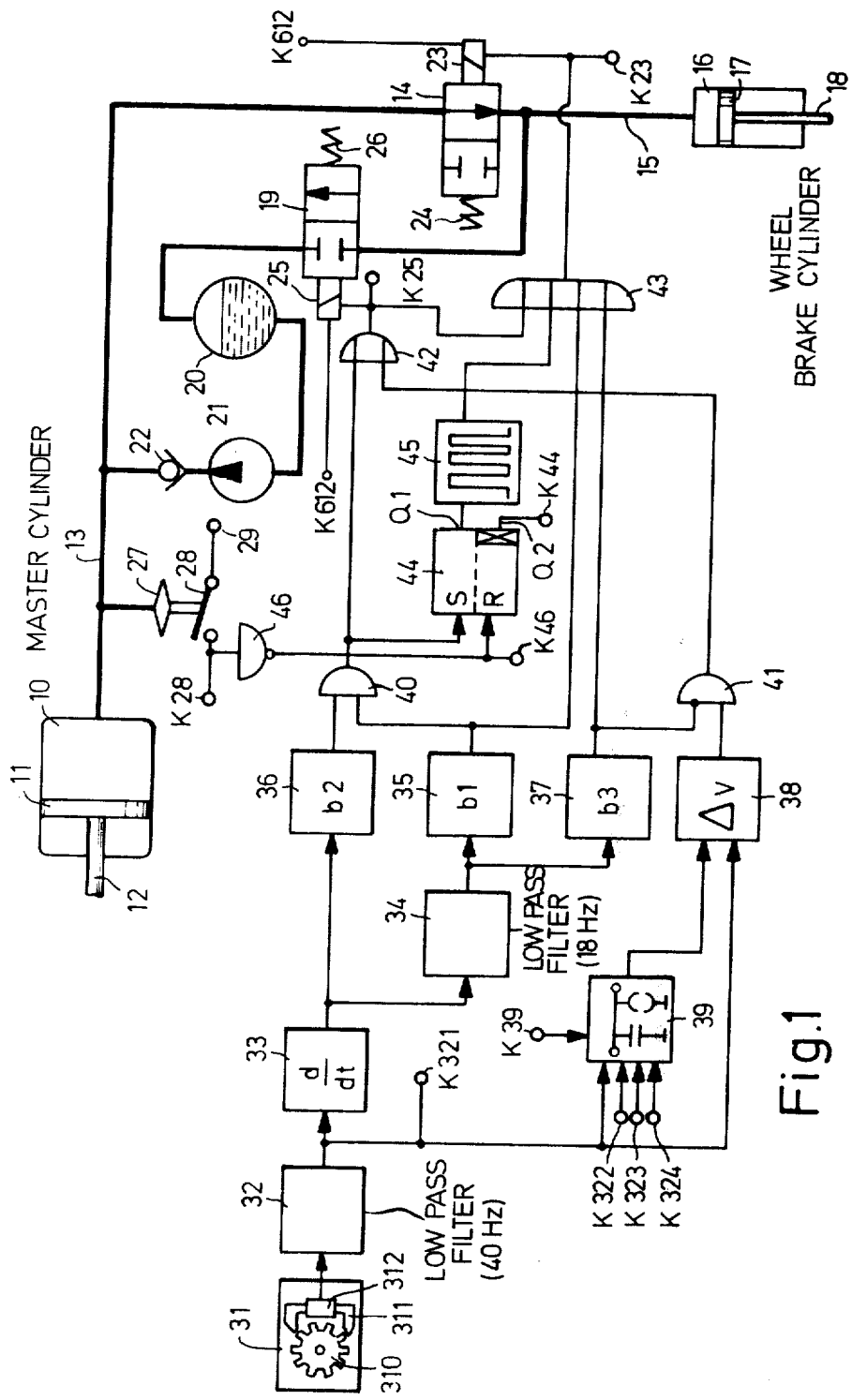
FIG. 1 is a highly schematic representation of a hydraulic braking system for a vehicle wheel, and a block circuit diagram of a single antilock control system.

The master cylinder 10 (FIG. 1) of a hydraulic fluid brake system has a piston 11 reciprocating therein, controlled by a piston rod 12, for example by an operator's pedal, by a power brake system, or the like. The master brake cylinder 10 is connected to a pressure line 13, and pressurized brake fluid can flow from the master brake cylinder 10 over line 13 to a normally open inlet valve 14 into a wheel brake line 15 and then into a wheel brake cylinder, to operate a wheel brake piston which, by means of its piston rod 18, operates brake shoes, pads, or the like. Various other valves 14, connected to the brake cylinders of other wheels can be connected to the master line 13.

The wheel brake line 15 is connected to a drain or bleeder valve 19, which is normally closed, and from which brake fluid can flow into a sump, or reservoir 20, for collection therein. A return pump 21 supplies brake fluid from sump 20 back to the main line 13; a check valve 22 prevents return flow.

The inlet valve 14 is operated by means of a solenoid 23. It is ordinarily maintained in quiescent, or open position by a spring 24. The inlet valve 14 is a 2/2 way valve and, in non-energized, quiescent position of the solenoid, there is a free path for pressurized brake fluid to flow from the main brake line 13 to the wheel brake line 15. In the energized condition of solenoid 23, the path through the valve is blocked. The drain valve 19 is operated by a solenoid 25. It is ordinarily maintained by a spring 26 in its quiescent position, in which the drainage path from wheel brake line 15 to sump 20 is blocked, that is, in quiescent condition the valve is closed. Drainage is permitted upon energization of the solenoid 25.

A pressure sensitive switch 28, operated by a pressure diaphragm 27 is connected to the main brake line 13. Switch 28 is the normal brake light switch, and connected to a line 29. When the switch is closed, that is, upon pressurization of line 13, a connection is established between the supply terminal 29 through switch 28 to a contact K28 which supplies brake lights, not shown, with electrical energy.

Operation of fluid brake system: Before braking, the antilock system is in the quiescent condition shown in FIG. 1, and brake light switch 28 is open. Upon operation of the brake, line 13 will be pressurized, and switch 28 will close. Hydraulic fluid can flow from the master cylinder 10 to the wheel brake cylinder 16, so that the pressure in the wheel brake cylinder will exactly correspond to the pressure in the master cylinder 10. The pressure will rise, therefore, at the beginning of braking.

If it is desired to maintain the braking pressure at a constant value, solenoid 23 of the valve 14 is energized. Both valves 14 and 19 are then closed, and pressurized brake fluid can neither flow to the wheel brake cylinder, nor can pressurized fluid drain from the wheel brake cylinder to sump 20. If the braking pressure should be decreased, the solenoid of the inlet valve 14 remains energized and the outlet valve solenoid 25 is energized. Pressurized brake fluid can drain or bleed from the wheel brake cylinder 16 into the sump 20. In each control cycle, a portion of the pressurized brake fluid will flow from the wheel brake cylinder 16 into the sump 20. The return pump 21 supplies the hydraulic fluid back into the main line because, otherwise, the master cylinder would be slowly drained of fluid. During braking, therefore, hydraulic brake fluid is supplied back to the master brake line 13 and to master cylinder 10 from sump 20.

An electrical, mechanical, or other interlock circuit or arrangement must avoid a fourth possible position of the two valves, namely energization of drain valve 19 without energization of the inlet valve 14. Under this condition, pressurized brake fluid could flow directly from the master cylinder 10 through the open valve 14 and then through the opened valve 19 into sump 20. The master cylinder 10 would be quickly drained. The interlock circuit which prevents this combination of effects is a connection from the output of an OR gate 42 to the input of an OR gate 43, the two OR gates 42, 43 being connected in advance of the windings 25, 23, respectively. Energization of solenoid 25 will, therefore, necessarily also energize solenoid 23, and thus open valve 14.

The electrical portion of the wheel brake antilock system includes an input pulse tachometer 31. A star wheel, or toothed, or gear wheel 310, formed with ferromagnetic teeth, rotates in synchronism with the rotation of the associated vehicle wheel or axle. A yoke 311 is located in magnetic circuit relationship to the star wheel 310. A coil 312 is wound on the yoke 311.

The output of the pulse tachometer 31 is connected to a series circuit of a first low pass filter 32, a differentiator 33, and a second low pass filter 34. A group of acceleration sensing threshold switches 35 are provided; a first threshold switch 35 is connected to the output of second low pass filter 34; a second threshold switch 36 is connected directly to the output of differentiator 33, and a third threshold switch 37 is likewise connected to the output of low pass filter 34. A speed comparison circuit 38 has one input connected to the output of the first low pass filter 32; the second input of the comparison circuit 38 is connected to the output of a vehicle wheel simulating stage 39. The vehicle wheel simulating stage 39 may be common to all the individual antilock systems, associated with the various wheels, or axles of the vehicle. The vehicle speed simulation stage has four inputs, denoted as terminals K321, K322, K323, K324. Terminals K321 and K324 are, each, connected to the outputs of the first low pass filters 32 of the various autonomous antilock systems. A fifth input to circuit 39 is connected to a terminal K39.

The outputs of the first and second threshold switch 35, 36 are connected to the inputs of an AND gate 40. The output of the AND gate 40 is connected over the OR gate 42 with the winding 25 of the drain valve 19, and further to a terminal K25. The second input of the OR gate 42 is connected to the output of an AND gate 41. The inputs of AND gate 41 are connected to the outputs of the third threshold switch 37 and to the output of the speed comparison circuit 38. OR gate 43, which controls at a terminal K23 the energization of the inlet valve solenoid 23 has a plurality of inputs; two inputs to control OR gate 43 are connected, respectively, to the outputs of the first and third threshold switches 35, 37. The output of AND gate 40 is further connected to the set input S of a control storage device 44, which, for example, may be a bistable flipflop (FF). One output Q1 of FF 44 is connected to the input of a pulse source 45, the output of which is connected to a fourth input of OR gate 43. Pulse source 45 may, for example, be an astable multivibrator. The reset input R of memory FF 44 is connected over an inverter 46 to the output terminal K28 of the brake light swtich 28. A second output Q2 of the memory FF 44 is connected to a terminal K44.

Operation

The detailed operation of the antilock circuit is explained in the cross referenced copending applications; its operation under various road conditions, in various conditions of wheel acceleration and deceleration are only of subsidiary importance for the monitoring circuit of FIG. 2, and therefore will be explained only briefly herein.

The pulse source 31, upon passage of the teeth, or projections of star wheel 310 pass yoke 311 and thus change the reluctance of the magnetic circuit which includes yoke 311 and star wheel 310 periodically with a frequency which is proportional to the speed of the star wheel 310 and hence to the speed of the wheel. Coil 312 will have a-c pulses induced therein which are filtered in the first low pass filter 32 and converted into a d-c voltage, of a value which is proportional to the speed of the vehicle wheel. If necessary, the low pass filter 32 may have a separate frequency-dc converter connected thereto, for example in form of a sample-and-hold circuit. The pulse tachometer 31, together with the subsequent frequency dc converter and/or the low pass filter 32 thus function, conjointly, as a source to generate a signal representative of wheel speed.

Differentiator 33, to which the vehicle wheel speed signal is applied, provides at its output a voltage which is representative of circumferential acceleration of the wheel, in which negative values of acceleration correspond to wheel deceleration (and the term "acceleration" as used herein should be understood to include deceleration, if the term has a negative sign), that is, the differentiator provides a signal representative of the rate of change of wheel speed. A suitable value as a unit for measurement for acceleration, or deceleration, respectively, may be the acceleration of gravity, $g = 10m/s^2$. Using acceleration of gravity as a basis for rate of change measurement in wheel brake antilock systems has been found to be suitable, since, upon braking on a dry road, a maximum vehicle deceleration of about 1g can be obtained. The further explanation herein will utilize the customary terms in digital technology, namely 0-signal and 1-signal. A stage provides a 1-signal when its output is at a predetermined positive voltage; it provides a 0-signal when its output is at a predetermined negative voltage or, for example, ground or chassis.

The threshold levels of the various threshold switches 35–37 are given in tabular form in Table I. As can be seen from the Table, the first threshold switch 35 responds to a circumferential deceleration, its ON-level b1 being set to a −3.5g. When the wheel deceleration is greater than −3.5g, the first threshold switch 35 provides a 1-signal which it retains during the entire delay phase of the braking control cycle. The output signal of the first threshold switch 35 returns to 0 only upon re-acceleration, and only when the switch-off threshold of +1.2g has been exceeded. There is, therefore, some switching hysteresis. The operation of the second threshold switch 36 can be compared with that of the first. In quiescent condition of the circuit, that is, if the wheel is not decelerated, and not accelerated, the second threshold switch 36 will provide a 1-signal since its ON-threshold level, which is slightly in the acceleration range of +0.1g, has already been passed in negative direction. The second threshold switch 36, already under quiescent conditions, therefore, will provide a 1-signal which may extend throughout the entire delay phase of the braking cycle and until there is a re-acceleration of the wheel. The Table I

| Threshold switch & level | ON-Threshold | OFF-Threshold | Signal when ON |
|---|---|---|---|
| 35 (b1) | −3.5 g | +1.2 g | 1 |
| 36 (b2) | +0.1 g | +1.0 g | 1 |
| 37 (b3) | +1.0 g | 0 g | 1 | third threshold switch 37 operates inversely, since, in the delay phase of braking it provides a 0-signal. Its ON-threshold level b3 is at +1.0g, and is exceeded only upon substantial re-acceleration. Thus, under re-acceleration of values in excess of 1.0g, the third threshold switch 37 will provide a 1-signal which is retained until the acceleration has dropped to 0g at the end of the re-acceleration phase of the braking cycle when the system has responded.

Antilock control cycle, with reference to FIG. 1 and Table I: Upon incipient blocking of a vehicle wheel, the wheel rate of change of speed will be so great that the threshold level b1 of the first threshold switch 35 (−3.5g) is exceeded. Both the first as well as the second threshold switches 35, 36 provide a wheel deceleration phase signal, that is, 1-signals (circuit 37 provides a 0-signal). AND gate 40 is energized and drain valve winding 25 is energized over OR gate 43; simultaneously, the supply valve 14 is closed by energization of solenoid 23 due to the connection of terminal K25 through OR gate 43. Both valves 19, 14, are now energized, and supply of pressurized brake fluid to the wheel brake cylinder is interrupted, while pressurized brake fluid therefrom can be drained to sump 20.

Due to the drop in braking pressure, the braking effort is decreased and the wheel deceleration decreases. As the wheel deceleration continues to drop, positive values of wheel acceleration will be reached. At a value of 1.0, the second threshold switch 36 changes state and provides a 0-signal, which terminates the pressure drop phase of the control cycle. AND gate 40 will block and not provide a 1-signal. The output signal of the differentiator 33 is connected directly to the second threshold switch 36. It is connected to the first threshold switch 35, however, over a second low pass filter 34 which, in an example, is designed for an upper limiting frequency of about 18 Hz. The output signal of the second low pass filter 34 thus, for all practical purposes, completely suppresses any spurious voltage pulses; however, the output signal of differentiator 33 is subject to some time delay. The pressure drop phase is initiated only with some delay although the first threshold switch 35 has responded; it is terminated, however, by the second threshold switch 36 without any time delay. After the pressure dropping phase of the antilock operation cycle, the braking pressure will be held on a constant level, since the third threshold switch 37 has a responded, and provides a 1-signal to the OR gate 43. The circumferential wheel acceleration drops and will eventually reach 0g. This terminates the re-acceleration phase, and the wheel circumferential speed will be approximately 1-signal of the vehicle speed. The third threshold switch 37 again changes state in its initial position to provide a 0-signal. None of the valves 14, 19 are now energized and braking pressure can again rise. This sequence of pressure changes - a first rise in pressure, a constant pressure phase and a pressure drop phase is periodically repeated in the subsequent control cycles.

When the first threshold switch 35 responds, the memory FF 44 is set and provides a 1-signal at its first output Q1. This 1-signal starts the pulse source 45. Starting at the second control cycle therefore, the output of the OR gate 43 will not have a permanent 0-signal applied thereto but, rather, during the pressure rise phase, the OR gate 43 will transmit the pulses from the pulse source 45 to solenoid 23. The inlet valve 14 is thus intermittently opened and closed, that is, is pulsed, and braking pressure can rise only slowly. The second control cycle, after first response of the system, will thus precede a slower pressure rise, and locking pressure (exceeding of the threshold level of the first threshold switch 35) is reached only slowly, if at all. The control amplitude or swing of pressure is thus decreased. The memory FF 44 is reset only at the termination of braking, that is, upon opening of brake light switch 28, that is, when a 1-signal appears at the output of inverter 46. Upon subsequent operation of the brake pedal, therefore, braking pressure can rise rapidly without pulsing.

Some road conditions may cause locking of the vehicle wheel during only a few cycles in spite of the presence of the system; this may occur, for example, if the road conditions change during braking, and become more slippery. To prevent such locking, an additional control is provided by means of the vehicle wheel speed comparison stages 38, 39. The vehicle wheel simulation stage 39 provides a dc voltage which is approximately representative of vehicle wheel speed. This vehicle wheel speed signal is compared in the speed comparator circuit 38 with the output voltage of the first low pass filter 32, that is, with the speed of the particular wheel to which the system is connected. If circumferential wheel speed has dropped to a value of about 15 km/h (about 10 mph) less than wheel speed, then the speed comparison circuit 38 provides a 1-signal which is connected over the AND gate 41 and OR gate 42 to the solenoid drain valve winding 25. Brake pressure drop is thus initiated. AND gate 41 has a second inverting input, as indicated by the dot input, connected to the third threshold switch 37. The output signal of the speed comparison circuit 38 therefore can be transmitted over OR gate 41 only when a third threshold switch 37 provides a 0-signal, so that the output signal from the speed comparison circuit 38 cannot be transmitted during the re-acceleration phase of the vehicle wheel (when the third threshold switch 37 provides a 1-signal).

The present invention is specifically concerned with a monitoring and control circuit to supervise a plurality of vehicle wheel antilock systems as explained in connection with FIG. 1, for example. It may be used, of course, also with other vehicle wheel brake antilock systems with appropriate modifications.

Let it be assumed that a vehicle with four wheels has a tachometer generator associated with each one of the four wheels, but that only a single separate autonomous antilock control system is provided for the rear axle of the vehicle. Three separate autonomous antilock control systems are thus provided for a two-axle vehicle, which are interconnected, or interrelated by the vehicle speed simulation stage 39. The speed simulation stage 39 is provided only once for the vehicle. The two separate wheel antilock control systems for the front wheels, that is, for the front axle, are interrelated and interconnected over the memory FF 44. Memory 44 and pulse source 45 is provided only once for the front axle. This is a suitable arrangement in order to decrease undesirable effects on steering if the road condition would be nonsymmetrical with respect to the wheels, for example, if the road surface under the right wheels has more friction than that under the left wheels. As soon as one of the antilock systems of the front axle has responded, both front wheel brakes will permit only slow, pulsed pressure rise.

The output and input terminals of the various stages are indicated in FIGS. 1–8 with a K, and the reference numeral of the associated stage, to easily determine the interconnection of the circuits of the various figures.

Figure 2:
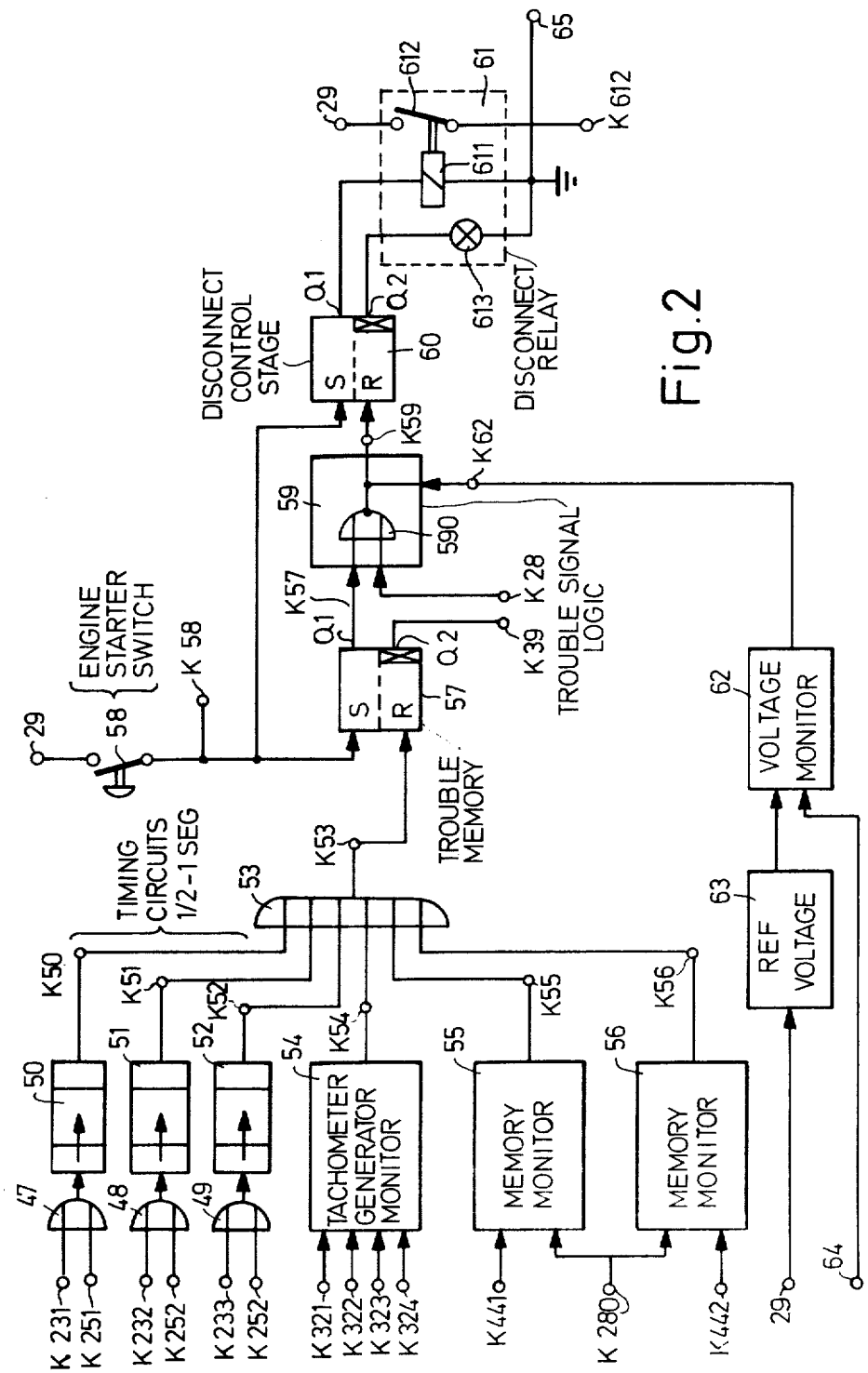
FIG. 2 is a block circuit diagram of the monitor circuit in accordance with the present invention.

Three OR gates 47, 48, 49 form the input to the circuit of FIG. 2. Each one of the OR gates has two inputs which, each, are connected to one of the solenoid windings 23 of the inlet valve 14, and the solenoid winding 25 of the drain valve 19, respectively. The input terminals are thus, respectively, denoted K231, 232, 233 and 251, 252, 253, respectively. Each one of the OR gates 47, 48, 49 is associated with a separate, autonomous antilock control system. Three memory or delay stages 50, 51, 52 are connected to the outputs of the OR gates 47, 48, 49. The outputs of the delay stages 50, 51, 52 are connected to three inputs of an OR gate 53.

A tachometer generator monitor stage 54 is connected to a further input of OR gate 53. Stage 54 has four inputs, connected with terminals K321 to K324, that is, to the output terminals of the respective low pass filters 32 associated with the respective vehicle wheels. Two monitor circuits 55, 56 monitor the operation of the memory FF 44 of the antilock systems. Each one of the monitor stages 55, 56 has two inputs. One input is connected with the respective output terminal K441 and K442 of the associated monitor FF 44; the other terminals are connected together and to the terminal K28 of the brake light switch 28.

The output of OR gate 53 is connected to the reset input R of a trouble store or memory 57, formed as a bistable FF 44. The set input of the trouble memory FF 57 is connected to the output terminal K58 of the engine starter switch 58. The engine starter relay (not shown) is additionally connected to terminal K58. The starter switch 58 connects to the main power supply of the vehicle as indicated by terminal 29.

The trouble memory FF 57 has two complementary outputs Q1, Q2. If one of the outputs has a 1-signal then the other one has a 0-signal. The second output Q2 is connected to the fifth input K39 of the vehicle speed simulation stage 39 (FIG. 1). The first output Q1 is connected with a first input of a trouble signal selector stage 59, the second input of which is connected to the output circuit K28 of the brake light switch 28. The input of stage 29 is a logic circuit 590 which in the embodiment of FIG. 2 is a NOR gate. The output of stage 59 is connected to the reset input R of a disconnect, or turn-off stage 60 which, preferably, is a bistable FF. The set input S of stage 60 is connected to terminal K58, and hence to the starter switch. The two outputs Q1, Q2 of stage 60 control a turn-off or disconnect relay 61. Its winding 611 is connected to the first output Q1. The switch circuit 612 has an output terminal K612 which connects with the positive supply 29 when relay winding 611 is energized. The windings 23, 25 of the respective valves associated with the various vehicle wheel antilock systems are connected to the terminal K612. Thus, upon de-energization of winding 611, power supply to the windings 23, 25, in case of trouble, can be interrupted. The second output Q2 of the disconnect or turn-off stage 60 is connected to negative bus or ground 65 through a warning light 613.

The trouble signal selector stage 59 has a third input which is connected with the output terminal, K62 of a voltage monitoring stage 62. Voltage monitoring stage 62 monitors the voltage at the positive bus 64. The supply bus 29 is further connected to a source of reference voltage 63 to provide a reference voltage to the voltage monitor stage 62. The various circuits of the stages illustrated in FIG. 2 will be described in detail in connections with FIGS. 3 to 8.

Operation: Upon starting of the engine of the vehicle, the trouble memory FF 57 and the disconnect stage stage FF 60 are set, since a 1-signal is provided to the set inputs S, when the engine starter switch is closed. When the disconnect stage 60 is set, the first output thereof provides a 1-signal which closes switch 612 by energizing relay winding 611. The second output provides a 0-signal, and warning lamp 613 remains extinguished. Windings 23, 25 can be supplied over terminals K23, K25 with current since they can be connected over the closed switch 612 to return line, or chassis or ground 65.

Setting of the trouble memory, upon operation of the engine starter switch 58 provides a 1-signal at its first output Q1. NOR gate 590 can provide a 1-signal only when both its inputs have a 0-signal applied thereto. Thus, when the trouble memory FF 57 is set, the logic stage 59 does not provide a reset signal to the disconnect stage 60. Operation of the engine starter switch thus activates the entire monitor system.

Let it be assumed that trouble arises in the antilock system of the vehicle. At least one of the stages 50 to 52, or 53 to 56 will provide a 1-disconnect signal to the OR gate 53. The 1-signal from OR gate 53 will be applied to the reset input R of the trouble memory FF which is reset, so that the first output Q1 of the FF 57 will provide a 0-signal. If, at this instant, the brake is not activated, terminal K28, that is, the brake light switch (FIG. 1) will likewise have a 0-signal, and NOR gate 590 will provide a 1-signal to the reset input R of the disconnect stage 60.

A reset signal at disconnect stage 60 causes reversal of the signals at the output from stage 60, relay 61 will drop out and, rather, alarm lamp 613 will light. The windings of the brake control valves can no longer be energized.

Let it be assumed that the brake has been operated just at the time when trouble arises. The terminal K28, connected to the brake light switch will then have a 1-signal applied thereto. The trouble signal of the trouble memory 57 can then be applied to the disconnect stage 60 only after braking has been terminated, that is, when the brake light switch has again been opened, so that the trouble or disconnect or reset signal can be applied to the reset terminal R of the disconnect stage. Upon sensing of a reset signal at the reset terminal R of disconnect stage 60, the same sequence as previously will obtain: winding 611 of relay 61 will be de-energized, switch 612 will open, warning lamp 613 will light. Windings 23, 25 will be disconnected from positive supply 29, so that they can no longer be energized. The antilock systems are disabled, and the driver is warned of trouble by illumination of lamp 613.

The disconnect control stage 60 is reset only after the braking operation, then initiated, is has terminated. The vehicle wheel simulation stage 39 is, however, influenced immediately over terminal K39 from the second output Q2 of the trouble memory FF 57. The fifth input K39 short circuits the output of the vehicle wheel simulation stage, so that a vehicle wheel speed difference (difference between circumferential wheel speed and vehicle speed) of 0 will be simulated, thus disabling operation of the comparison circuit 38. This is desirable since, otherwise, erroneous speed information could be transmitted to the vehicle speed simulation stage by the antilock system in which trouble arose.

The delay circuits 50 to 53 are so dimensioned that the 1-signals at their inputs are transmitted to the output with a delay of from about ½ to 1 second. 1-signals which are shorter than the delay time are not transmitted. The normal on-duration, that is, the energization period of the magnetic valves 14 to 19 usually is in the order of 0.2 to 0.3 seconds. The delay elements 50, 51, 52 respond when the energization period of the magnetic valves 14, 19 is excessive, and characterize such excessive energization periods as trouble. The OR gates 47, 48, 49 are connected, respectively, to the inlet and outlet valve solenoids 23, 25 so that excessive energization of either one of the valves is simultaneously sensed. The valves of various antilock control systems should not be connected merely to a single OR gate, with a single delay circuit, since the valve opening times of different antilock systems may overlap.

The energization duration of the magnetically controlled valves is thus supervised by the delay circuits 50 to 52 and, therefore, the proper operation of the following stages in the antilock systems is monitored: differentiator 33, second low pass filter 34, threshold switches 35, 36, 37 (and such other threshold switches as may be provided and not shown), speed comparison circuit 38, the various gates in the system, that is, in FIG. 1 gates 40 to 43, and the associated amplifiers.

The tachometer generator monitoring stage 54 has as its input the outputs from all the tachometer generators as well as the first low pass filter (and frequency-dc converter, if used). A single monitoring stage is sufficient. Any trouble in the generation of the speed signals may lead to substantial malfunction in the control of braking pressure. When the output signal of any one of the tachometer generators 31, and filter 32 shows a greater statistical deviation with respect to all the other tachometer generators, then the speed comparison circuit 38 will respond and provide a 1-signal. This continuous 1-signal is monitored over the delay circuits 50-52 due to their supervision of the valves. If, for example, one of the tachometer generators 31, or a low pass filter 32 (or the frequency-dc converter, if used) has an intermittent connection, then the output voltage of the first low pass filter 32 will vary greatly. Intermittent, or poor connections would give rise to an output from a differentiating stage included in tachometer generator monitor 54, the detailed circuit of which will be explained below in connection with FIG. 4.

The various respective antilock systems permit only slow, pulsed pressure rise after the first response of the antilock system, that is, as soon as the storage FF 44 (FIG. 1) has been set, that is, the circuit which controls operation of the pulsing circuit 45. At first operation of the brake pedal, that is, during the first control cycle, brake pressure should rise steeply in order to reach the maximum permissible braking pressure, controlled, for example by the operator to be just below the locking pressure, to be reached as quickly as possible. The two memory monitor stages 55, 56 provide 1-trouble signals if the associated storage FF 44 has not been reset. Stages 50-56 thus monitor all stages of the circuit of FIG. 1. Additionally, errors in the current supplied to the antilock system may arise. This current supply is not shown in FIGS. 1 and 2, and is connected to the usual and customary electrical system of the vehicle. Customarily, the vehicle system has a predetermined voltage, for example 12 V, which is connected to a main supply bus or main supply terminal 29. This supply voltage can vary widely. A stabilizing circuit, not shown, is connected to this uncontrolled varying vehicle terminal and provides a stabilized voltage somewhat below the nominal supply voltage, for example +10 V, which is used to supply current to the various stages of the control circuit of FIG. 1. The stabilized supply voltage is preferably selected to be just below the lowest expected voltage in the vehicle, considering the type of current supply, and battery used. Should the stabilization circuit have a short circuit, or an open circuit, then the controlled supply voltage will deviate from the command or reference voltage of +10 V. This deviation, upwardly or downwardly, is sensed by the voltage monitor 62. Any trouble in the stabilization circuit would have an immediate effect on the wheel brake antilock system of all wheels, and, therefore, the output signal from the voltage monitoring stage 62 may not be applied to the input of the trouble signal logic circuit 59. Rather, all the valves of all the antilock systems must be disabled immediately, even if this condition should occur during braking. Otherwise, all four wheels of the vehicle may be subjected to completely uncontrollable braking conditions. The output of the voltage monitoring stage 62 is therefore connected to the output line from the trouble signal logic circuit, that is, to the output of the NOR gate 590. There is no interconnection of the output signal thereof with the output signal of the brake light switch 28.

Figure 3:
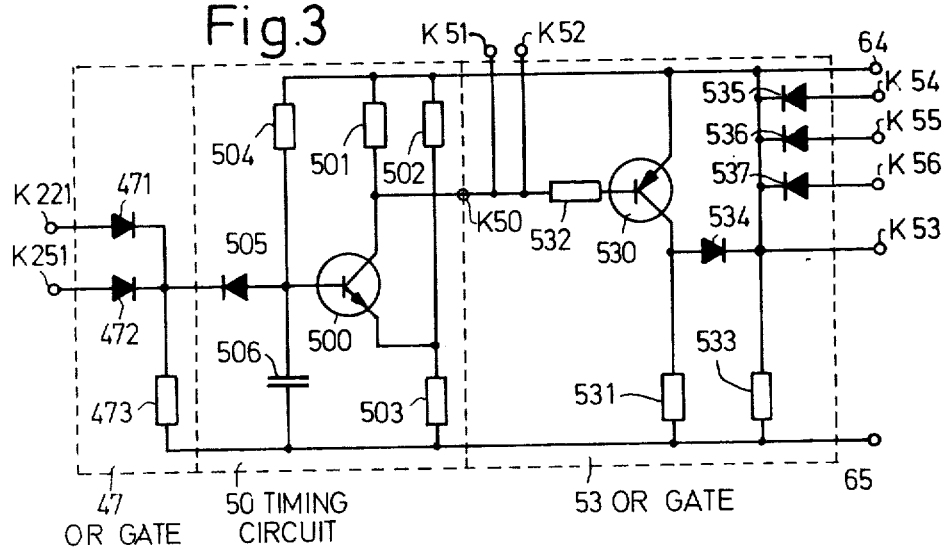
FIGS. 3 to 8 are individual circuit diagrams of individual components of the circuits illustrated in block form in FIG. 2.
Figure 4:
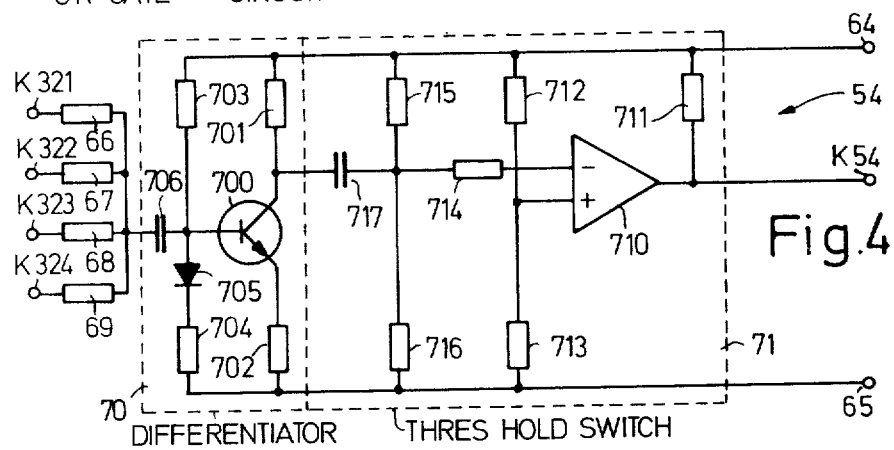
Figure 5:
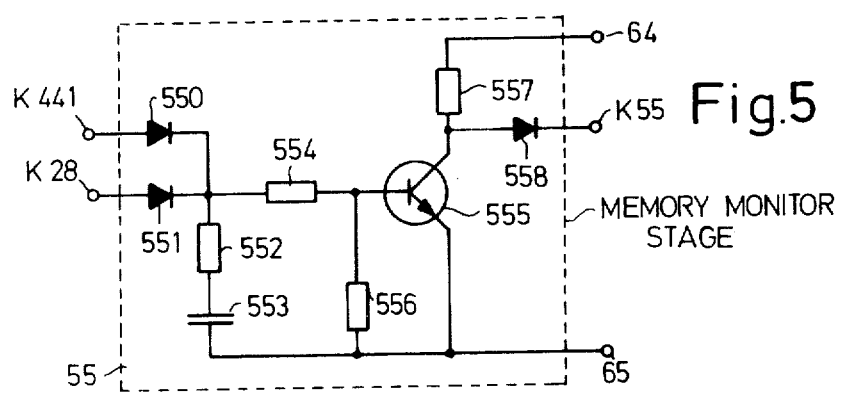
Figure 6:
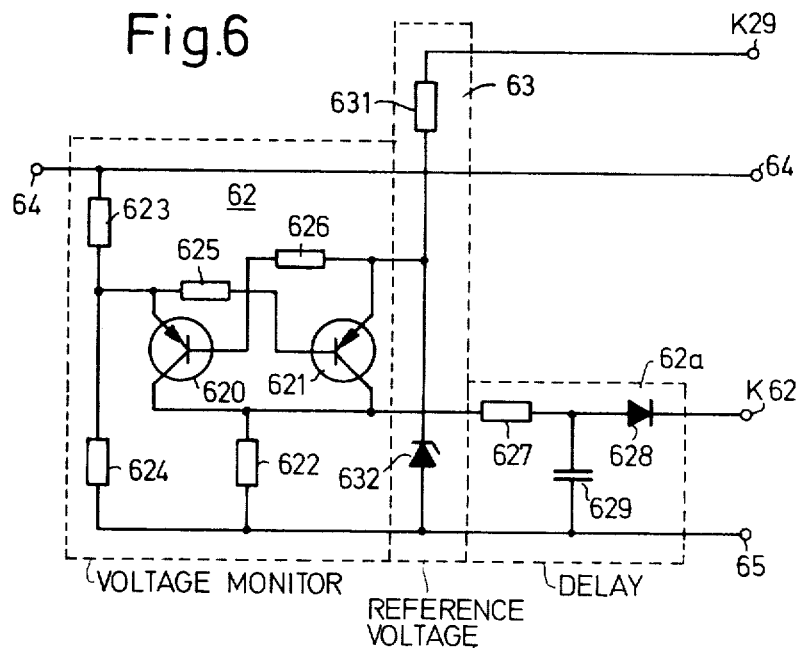
Figure 8:
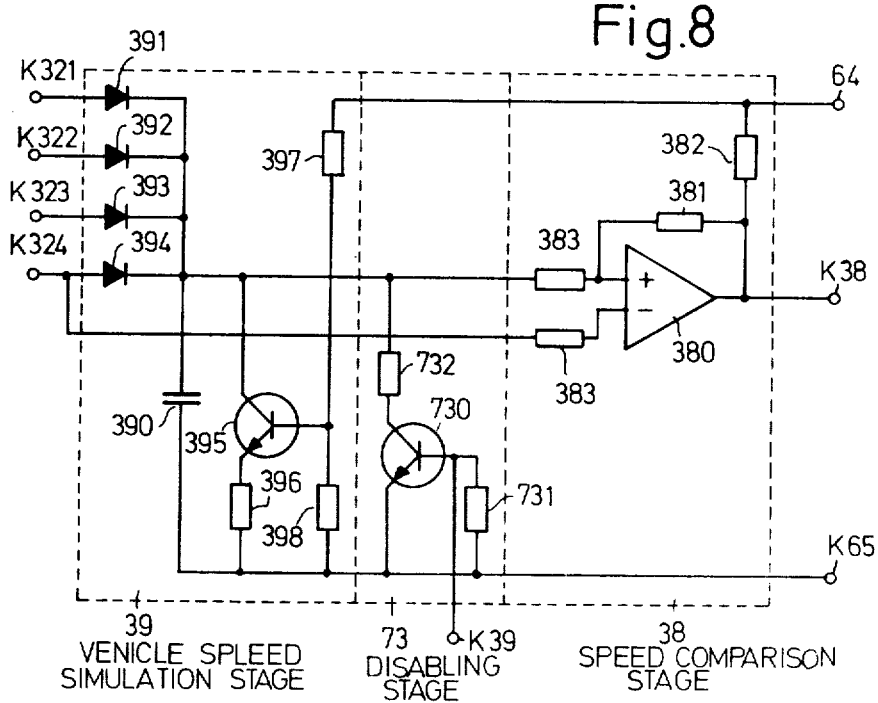
Figure 7:
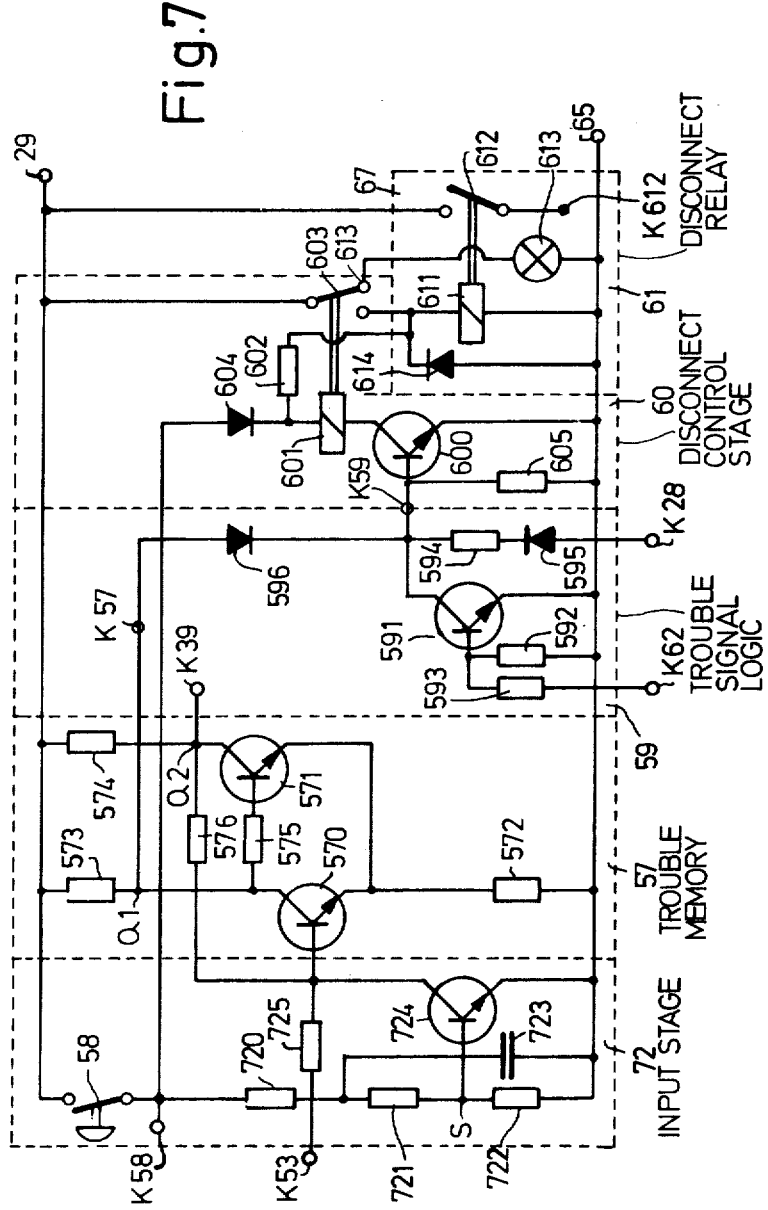

Detailed circuits, with reference to FIGS. 3 to 8: FIG. 3 shows the circuit of OR gate 47, delay stage 50 and OR gate 53. FIG. 4 illustrates the circuit diagram of tachometer generator monitor stage 54, formed, generally, of a differentiator 70 and a threshold switch 71. FIG. 5 shows the circuit diagram of memory monitor stage 55. FIG. 6 illustrates the circuit diagram of the voltage monitor stage 62 and the reference voltage generator 63. FIG. 7 shows the circuit diagram of the trouble memory 57, the trouble signal logic circuit 59, the disconnect control stage 60 and the disconnect relay 61, as well as a hold stage 72. FIG. 8 is a circuit diagram of the vehicle speed simulation stage 39 and of the speed comparison stage 38, and of a short circuit or disabling stage 73 controlled from terminal K39 (FIG. 1).

FIG. 3: Two diodes 471, 472 form the input to OR gate 47. The cathodes of the diodes 471, 472 are connected together and connected over a resistor 473 to negative bus 65. The anodes are connected, respectively, to the terminals K231 and K251.

The output of the OR gate is connected to the common junction of the cathodes 471, 472 and is connected to delay circuit 50 which, as active element, includes an npn transistor 500, the collector of which is connected over resistor 501 to positive bus 64. Positive bus 64 has, as above noted, the controlled, stabilized dc voltage, for example of +10 V. The emitter of the transistor 500 is connected to the tap point of a voltage divider formed of resistors 502, 503 and connected across stabilized positive bus 64 and negative or ground, or chassis bus 65. The base of the transistor 500 is connected over resistor 504 to positive bus 64 and over a diode 505 to the output that is to the cathodes of diodes 471, 472. A capacitor 506 connects the base to chassis bus 65. The output from the delay circuit appears at terminal K50, between the collector of transistor 500 and the collector resistor 501. The OR gates 48, 49 and delay circuits 51, 52 are similar to the OR gate 47 and delay circuit 50, respectively, and the outputs thereof appear at terminals K51, K52. Transistor 555 is conductive and its collector provides a 0-signal. As soon as the brake is operated, terminal K28, connected to the brake light switch 28 will also provide a 1-signal which is transferred over diode 551 to the base of transistor 555, and transistor 555 during braking remains conductive also when the wheel antilock system responds and the storage FF 42 becomes set. The 0-signal at the second output Q2 of the storage FF 44 is overridden by the 1-signal at terminal K28, derived from the brake signal. If, however, the storage FF 44 does not reset at the end of braking, that is, upon release of the brake signal, then the anodes of both diodes 550, 551 will have 0-signals thereat. After discharge of capacitor 553, no more base current will be transferred to transistor 555, which will block, and provide a 1-signal at its collector as a trouble, or malfunction indication, which is further transferred over terminal K55 to the OR gate 53 (FIG. 2). Capacitor 553 is provided to bypass short signal overlaps between the brake light switch and the FF 44 (FIG. 1).

FIG. 6: The reference voltage source 63, connected to the voltage monitoring stage 62 essentially is a series circuit of a resistor 631 and a Zener diode 632, the series circuit being connected between the unregulated supply line 29 and the negative or ground or chassis bus 65. The voltage monitor stage 62, at its input, includes a low pass filter element 62a. Two pnp transistors 620, 621 are the active elements of the voltage monitoring stage 62. Their collectors are connected to a common junction which is connected to the negative bus 65 over a resistor 622. The emitter of the first transistor 620 is connected to the tap point of a voltage divider formed of two resistors 623, 624, which is connected between the positive bus 64 and negative or chassis bus 65. The emitter of the second transistor 621 is connected to the junction between the resistor 631 and the Zener diode 632. The emitter of one transistor is further connected to the base of the other; thus, the emitter of transistor 620 is connected over resistor 625 with the base of transistor 621 and the base of transistor 620 is connected over resistor 626 to the emitter of transistor 621. The connecting line extends from the junction of the collectors of transistors 620, 621 to the series circuit formed of resistor 627 and capacitor 629, which is connected to chassis bus 65. The junction between resistor 627 and capacitor 629 is connected to a diode 628 which, in turn, is connected to the output terminal K62 of the voltage monitoring stage 62.

Operation: The supply terminal K29 is connected to the unregulated vehicle electrical network terminal 29, for example +12 V. The positive bus 24 is connected to a stabilized voltage of, for example, +10 V. Zener diode 632 has a Zener voltage which is equal to that arising at the tap point of the voltage divider formed of resistors 623, 624, when the voltage at terminal 64 is of the proper, regulated value. A preferred voltage is 5.6 V. This voltage is preferred, since Zener diodes having this breakdown voltage have a temperature coefficient of approximately 0. If the stabilization circuit to supply positive bus 64 is functioning properly, then both transistors 620, 621 will be blocked since both base and emitter will be at the same voltage. Output terminal K62 thus will have a 0-signal, if there is no malfunction.

If the stabilization circuit has a short circuit, then the voltage of positive bus 64 will rise over +10 V, and first transistor 620 will have a more positive voltage at its emitter, than at its base, and transistor 620 becomes conductive. A 1-signal is transmitted over resistor 627 and diode 628 to output terminal K62. This 1-signal immediately resets the disconnect stage 60, that is, as soon as malfunction is sensed. If there should be a line break in the voltage stabilization circuit, then the voltage at positive bus 64 will drop below +10 V. Again, a 1-signal will arise at terminal K62. The second transistor 621 will have its base at a more negative voltage than the emitter, and will become conductive. Capacitor 629 is used to smooth the output signals of the voltage monitoring stage 62. This is desirable, since, if there is trouble in a stabilization circuit, all voltages will jump suddenly and will include spurious voltage peaks. The voltage monitoring stage 62 can, therefore, also monitor interruptions in the supply line 29, since in this case the voltage at the cathode of Zener diode 632 will drop appreciably causing the first transistor 620 to become conductive. The main supply line 29 simultaneously serves as positive supply for the valves, so that the positive supply to the valves is, also, automatically supervised.

FIG. 7: The trouble memory stage 57, as such, has two npn transistors 570, 571, the emitters of which are connected together, and the common junction is connected over resistor 572 to negative bus 65. The two transistors 570, 571 have respective collector resistors 573, 574, connected to the unregulated bus 29, although they can be connected to the regulated bus 64, if desired. Each of the collectors of the transistors is connected to the base of the others over respective resistors 575, 576. The collectors of the two transistors 570, 571 form the two outputs Q1, Q2 of a bistable flip-flop.

The input or holding stage 72 has an input voltage divider formed of three resistors 720, 721, 722. The voltage divider is connected between the output terminal K58 of the starting switch 58 (FIG. 2) and negative bus 65. The junction of the first and second resistors 720, 721 is connected to a capacitor 723 which connects to the negative bus 65, and thus shunts both resistors 721, 722. The junction of the second and third resistors 721, 722 is connected to the base of a npn transistor 724, the collector of which is connected to the base of the first transistor 570 of the trouble memory FF 57. The emitter of transistor 724 is connected to chassis bus 65. The output terminal K53 of the OR gate 53 is connected over coupling resistor 725 to the collector of transistor 724 and hence to the base of trouble memory FF transistor 570. The base of transistor 724 forms the set input S of the bistable FF 57; the reset input R is formed by the base of the transistor 570.

An inverter stage is connected to the output terminal K57, included in the trouble signal logic circuit 59. The inverter stage has an npn transistor 591. The emitter of transistor 591 is connected directly to chassis bus 65. Its base is connected to chassis bus 65 over a base resistor 592. A resistor 593 connects between the base of resistor 591 and terminal K62, which is the output terminal of the voltage monitor circuit 62 (FIGS. 2, 6). The logic circuit 590 is formed by a resistor 594 and two diodes 595, 596. Diode 596 is connected between the output Q1 of the trouble memory 57 and the collector of transistor 591. Diode 595, in series with a resistor 594 is connected to the output terminal K28 of the brake light switch 28, and further to the collector of the transistor 591.

Diodes 595, 596 form the logic circuit 590 of FIG. 2. Contrary to FIG. 2, the logic circuit 590 is formed as an OR gate. The output of OR gate 595, 596, connected to the base of the transistor 600 can be short circuited by the inverter stage formed of transistor 591 and resistor 592. A signal on terminal K62 can thus override signals from terminals K28 (brake light switch) or K57 (trouble memory). The output from trouble signal logic will appear at terminal K59.

The disconnect control stage 60 is a bistable FF, and has an npn transistor 600, as well as a self holding relay circuit including relay 601, resistor 602, and relay switch 603. Transistor 600 has its emitter connected to negative bus 65 and its collector through relay winding 601 and a diode 604 to terminal K58 of the starter switch. Relay 601 operates transfer switch 603. The movable contact of transfer switch 603 is connected to supply line 29. The first fixed contact of transfer switch 603 is connected to a parallel circuit formed of winding 611 of disconnect relay 61, and a free wheeling diode 614, both connected to negative bus 65; a resistor 602 connects to the junction between diode 604 and relay winding 601. A second fixed contact of transfer switch 603 is connected to the warning lamp 613 (FIG. 2, FIG. 7) which, in turn, is connected to chassis bus 65. The base of transistor 600 is connected directly to the collector of transistor 591, through terminal K59. A base resistor 605 connects to chassis bus 65.

Operation: Upon starting of the vehicle, that is, upon operation of starter switch 58, trouble memory 57 and disconnect stage 60 are set. Upon closing of the starter switch, capacitor 723 in the input hold stage is quickly charged over low resistance resistor 720. The base voltage of transistor 724 rises, and transistor 724 becomes conductive. The base of transistor 570 is thus short circuited, so that in quiescent condition of the circuit, trouble memory 57 is in the state in which the first transistor 570 is blocked and the second transistor 571 is conductive. After the starter switch 58 has been released, transistor 724 remains conductive, since capacitor 723 can discharge only slowly over the high resistance resistors 721, 722. The delay time, when for example applied to passenger vehicles may, for example, be about 0.3 seconds.

The delay time bridges that period during which the battery voltage drops substantially, due to the operation of a starter motor, so that disconnection in the antilock system may occur. After the delay time, the blocked transistor 724 can no longer influence the base voltage of transistor 570, so that the initial switching state of the trouble memory 57 will remain in the circuit.

Closing of the starter switch 58 has a further effect; the supply line 29 is connected to the anode of diode 604 in the disconnect stage 60. As soon as the trouble memory 57 is set in its base state by the hold stage 72, the base of transistor 600 has a 1-signal applied thereto over diode 596. If the starter switch 58 is still closed, current can flow over diode 64, relay winding 601, and the collector-emitter path of transistor 600 to the negative line 65. This changes the transfer contact 603 of the relay 601, 603 over to the other terminal, that is, to the left side terminal in FIG. 7. Winding 601 is now connected through the switch contact 603 and resistor 602 to the positive bus 29. The current can now flow to the winding 601 even after the starter switch 58 has been released, so that the relay winding 601 remains energized and switch 603 in the left side position. Before operation of the starter switch 58, the relay is in the position shown in FIG. 7, and the warning lamp 613 will light. This is a check for continuity of the warning lamp.

The base condition, above described, of the trouble memory 57 and the disconnect stage 60 will change only if malfunction arises in the antilock system. Two situations may arise:

1. Malfunction arises during braking. OR gate 53 provides a 1-signal to terminate K53 which is applied to the reset input R of the trouble memory 57. First transistor 570 in the trouble memory 57 becomes conductive, and its collector provides a 0-signal at the output Q1. The trouble memory 57 remains in this condition even when the malfunction signal (that is, the 1-signal at terminal K53) is removed. The stiff feedback of the bistable FF 57 holds the FF in this position. So long as braking persists, and brake light switch 28 is closed, the base of transistor 600 in the disconnect stage will, however, receive base current over diode 595, connected to terminal K28. Transistor 600, for the duration of braking, therefore, remains conductive. As soon as braking is terminated, transistor 600 blocks and relay winding 601 becomes de-energized, and transfer switch 603 changes over to the position shown in FIG. 7. Warning lamp 613 lights, winding 611 is de-energized and its relay contact 612 opens to interrupt current to the windings 23, 25.

2. Malfunction during vehicle operation in current supply: malfunction arises in the current supply, for example in the stabilization circuit. In this case, the voltage monitoring stage 62 responds and provides a 1-signal to terminal K62, connected to the trouble signal logic stage 59. The normally blocked transistor 591 becomes conductive and the base of transistor 600 is thus short circuited to chassis bus 65. Relay 601, 603 immediately drops out, even if the brake light switch 28 should be closed. The internal resistance of transistor 591 in any case is less than the resistor 594.

FIG. 8, vehicle speed simulation stage 39 (FIG. 1) and speed comparison stage 38: a storage capacitor 390 is the main element to store a signal representative of vehicle speed. It is connected, on the one hand, to negative bus 65 and on the other to the cathodes of four diodes 391, 392, 393, 394, each of which are connected to terminals K321-324, respectively, which are the output terminals from the low pass filter 32 (FIG. 1) of the respective speed sensing circuits of the various vehicle wheels. A constant current source formed by an npn transistor 395 having an emitter resistor 396 are connected in parallel to the capacitor 390. The base of transistor 395 is connected to a voltage divider formed of resistors 397, 398 and connected across stabilized supply bus 64 and 65.

A disabling or short circuit stage 73 is connected to the vehicle speed simulation stage 39, which has an npn transistor 730, the emitter of which is connected to negative bus 65. Its collector is connected over a resistor 732 to the cathodes of the diodes 391-394. The base of transistor 730 is connected over a resistor 731 to negative bus 65 and further to input terminal K39 (FIGS. 1, 8) to form a fifth input for the speed simulation stage 39.

A speed comparison stage 38 is constructed as a threshold switch including an operational amplifier 380, the output of which is coupled back over coupling resistor 381 to the non-inverting input. A load resistor 382 connects from the output of operational amplifier 380 to stabilized supply bus 64. The non-inverting input of operational amplifier 380 is connected over coupling resistor 383 to the cathodes of diodes 391-394. The inverting input is connected over coupling resistor 383 to the specific input terminal K321-324 of the specific vehicle wheel with which the antilock system is associated, as shown with terminal K324, for example the fourth wheel.

Operation: that one of the diodes 391 to 394 is conductive which has its anode at the highest positive voltage. Storage capacitor 390 is thus charged to a voltage which is representative of the circumferential speed of that wheel which rotates fastest. It may be assumed that the wheel which rotates fastest provides an output speed signal which is approximately representative of vehicle speed. The only exception would arise when all four wheels would lock simultaneously, so that the voltages at the terminals K321 to K324 will all drop rapidly. In this case, all diodes 391 to 394 will block. Storage capacitor 390 is then discharged over constant current source 395, 396. The discharge current is so set that it corresponds to a vehicle deceleration of 1g (arithmetically: −1g). Thus, optimum braking of the vehicle is simulated. If one of the wheels, due to response of the associated antilock system accelerates, storage capacitor 390 will be charged over the associated diode to the proper voltage.

The operational amplifier 380, functioning as a threshold switch, compares the simulated vehicle speed, that is, the voltage at storage capacitor 390 with the wheel speed of the specific wheel with which the circuit is associated, as shown, the voltage at terminal K324. As soon as wheel speed drops by a predetermined value below vehicle speed, for example, about 15 km/h, threshold switch 380 provides a 1-signal at its output terminal K38, which operates valves 19, 14, to lower the braking pressure. The preset difference of speed of about 15 km/h is determined by the inherent threshold voltage level of the respective diodes 391-394 which is, in case of silicon diodes, approximately 0.7 V.

Only a single vehicle speed simulation stage is needed for the vehicle, and thus all the antilock systems of the vehicle are interconnected by means of this stage. It is thus necessary to disable the speed comparison stage 38 if there is malfunction in the antilock system even if the vehicle is still being braked. Otherwise, a single antilock system may distort the control effects of the other antilock systems and may cause malfunction of other systems. The fifth input K39 is therefore provided to directly control the vehicle speed simulation stage from the trouble memory 57, bypassing the trouble signal logic 59.

In case of malfunction, a second input Q2 of trouble memory 57 (FIG. 2; FIG. 7) provides a 1-signal which is applied to the base of transistor 730 (FIG. 8), which then becomes conductive. The non-inverting input of operational amplifier 380 is thus placed on chassis or 0 voltage. No vehicle wheel speed can become less than 0, and therefore the threshold switch 380 can no longer supply a 1-signal. All the speed comparison circuits 38 of all the antilock systems are therefore disabled.

The system of FIG. 2, and specifically as explained in connection with the circuits of FIG. 3 to 8 thus provides a solution for the object of the present invention, and simultaneously monitors various separate, independent autonomous antilock systems in a vehicle. If malfunction or trouble should arise during braking, the antilock systems are disabled only after the operator has ceased braking. Thus, those vehicle wheels which are not affected by trouble, that is, those wheels which are controlled by trouble-free antilock systems continue to be optimally braked. The wheel affected by a malfunctioning antilock system may, however, be braked only slightly, or not at all. In contrast, any malfunction which may affect all wheels, that is, malfunction in the current supply, immediately disables all the antilock control systems. Thus, it is necessary for the operator to correct for failure of the antilock system only under condition of loss of electrical power, and correct for such failure by at least partially releasing braking pressure. It is not possible to completely relieve the vehicle operator of all supervisory responsibility for operation of the vehicle, since, upon malfunction in the current supply to the vehicle, or within the antilock system, the antilock systems might respond with completely uncontrollable command signals.

Malfunction which affects only one of the wheels immediately disconnects the speed comparison circuit, to ensure that the various separate, independent and autonomous antilock systems are completely isolated from each other. The system which is subject to trouble can no longer affect the remaining systems.

A supervisory circuit in accordance with FIG. 2 completely disables the particular brake of the vehicle wheel in which trouble arises, so that that particular wheel will not have any braking effort applied to the road surface any more. This decrease in overall braking effect can be avoided by utilizing the circuit of FIG. 9. This additional circuit disables a defective antilock system immediately upon sensing of malfunction, even during braking. It is possible that the wheel, which is now unregulated and responds only to brake fluid pressure may lock. A locked wheel, however, still applies some braking effort on the road surface, certainly more than a free running wheel. A choice has to be made in the individual case, if the additional circuit of FIG. 9 is to be used, since a locked wheel has little effect on steering; a compromise, or trade-off has to be made between obtaining better braking effort and less steering capability, or better steering and less braking effort.

Figure 9:
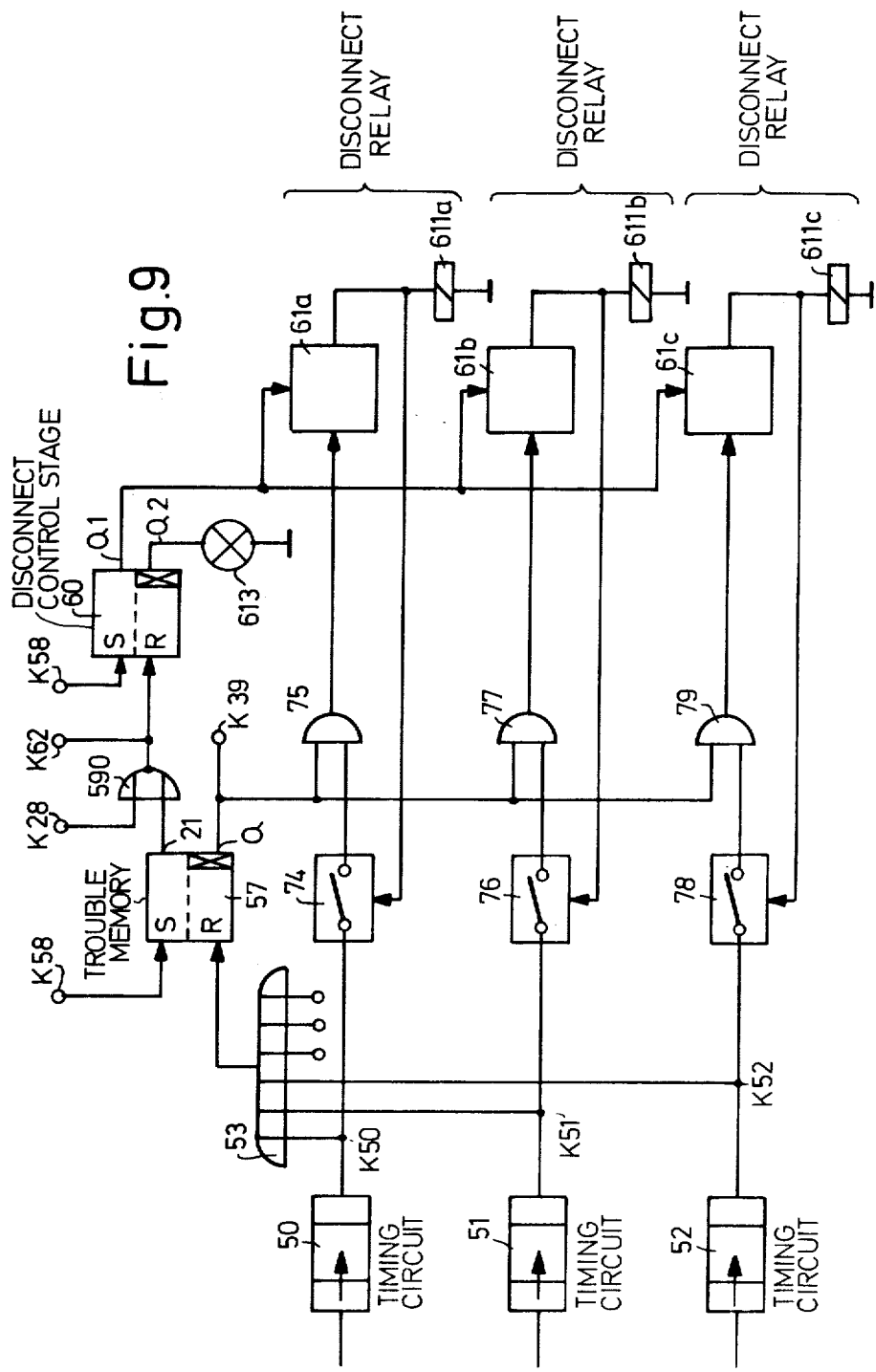
FIG. 9 is a highly schematic, fragmentary block circuit diagram of an addition, or attachment feature with respect to the circuit of FIG. 2

Embodiment of FIG. 9: Stages, elements and components which are similar to those already described have been given the same reference numerals and will not be described again. 61a, 61b, 61c are the disconnect relays of three individual autonomous antilock systems. The associated relay coils are shown at 611a, 611b, 611c. The delay circuit 50 associated with the first antilock system is connected to an input of the OR gate, and further to a series circuit formed of an interrupter switch 74 and one terminal of an AND gate 75. The output from AND gate 75 is connected to an additional terminal of the disconnect relay 61a. Similarly, the other delay circuits 51, 52 are connected to OR gate 53 and through series switches 76, 78 and AND gates 77, 79 to auxiliary input terminals at disconnect relays 61a, 61b. The second input of the AND gates 75, 77, 79 is connected to the output Q2 of the trouble memory 57. The three switches 74, 76, 78 are controlled switches, control of the switch being effected by a connection from the energization line of the disconnect relay windings 611a, 611b, 611c.

The disconnect controlled switches 74, 76, 78 are closed if the control input thereto has a 1-signal applied. The additional input to the disconnect relays 61a, 61b, 61c is so connected that the associated solenoid 611a, 611b, 611c is de-energized, so that the associated antilock system is disabled by disconnection of the valve windings. The circuit details of the circuit will be discussed in connection with FIG. 10.

Operation: in quiescent condition of the circuit, the trouble memory 57 is set and the output Q1 provides a 1-signal. The disconnect stage 60 is likewise set and the output Q1 of the disconnect stage 60 is energized so that the relay windings 611a, 611b, 611c are energized thus closing the associated relays 612 (not shown). 1-signals are, therefore, available at the windings 611a, 611b, 611c and these 1-signals are fed back to the disconnect switches 74, 76, 78 which close these switches and maintain the switches in closed conditions.

Let it be assumed that the first antilock system (with disconnect relay 61a, winding 611a) has malfunctioned. The first delay circuit 50 provides a 1-signal which, as discussed in connection with FIG. 2, is transmitted over the OR gate 53 to reset the trouble memory 57 which now provides a 1-signal at the second output Q2. The disconnect switch 74 is still closed and both inputs of the first AND gate 75 will have 1-signals, which is transmitted through the output from the AND gate to the auxiliary input and, in accordance with the above described connection, the disconnect relay 61a is de-energized. This causes de-energization of the coil 611a, a 0-signal is transmitted to the control line of switch 74 which will open. The switches 74, 76, 78 are so constructed that, although they were opened, they continue to provide the previously existing signal, in this case a 1-signal which they continue to provide to the AND gates 75, 77, 79. After the malfunction has been detected, no more current can, therefore, be applied to the relay winding 611a. The delay circuit 50 is separated from AND gate 75 by the switch 74; the associated antilock system can no longer energize the valves 14, 19 due to the dropout of the disconnect relay coil 611. As soon as the valves are no longer energized, however, the delay circuit 50 will again provide a 0-signal which would free the disconnect relay 61, unless the interrupter switch 74 would not be provided, and, in case of a continued malfunction, the magnet winding 611 would be periodically supplied with current and disconnected.

Figure 10:
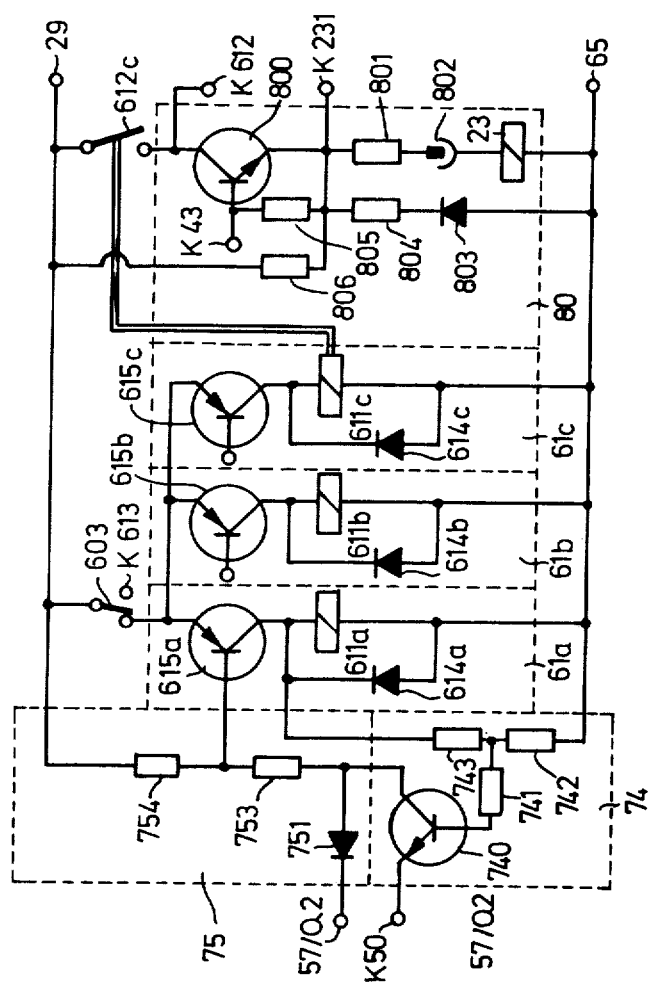
FIG. 10 is an individual circuit diagram of portions of the circuit of FIG. 9.

FIG. 10 illustrates the circuit details of AND gate 75, the interrupter switch 74, the disconnect relays 61 and a power amplifier 80.

AND gate 75 is formed by the series circuit of two resistors 753, 754 and a diode 751. This series circuit is connected between the second output Q2 of the trouble memory 57 and of the positive supply bus 29. Diode 751 forms the first input of AND gate 75. The second input of AND gate 75 is formed by an npn transistor 740, which is part of the turn-off circuit 74. Transistor 740 has its emitter connected to terminal K50 of the first delay circuit 50; its collector is connected to the junction point between diode 751 and resistor 753. The base of transistor 740 is connected over a coupling resistor 741 to the tap point of a voltage divider formed of resistors 742, 743, connected in parallel to the winding 611a of disconnect relay 61a. The disconnect relays 61a to 61c differ somewhat from the circuit 61 of FIG. 7. Switch 603, controlled from the disconnect stage 60, supplies three separate disconnect relays 61a, 61b, 61c with current. pnp transistors 615a, 615b, 615c are connected between the switch 603 and the windings 611a, 611b, 611c. Free wheeling diodes 614a to 614c are connected in parallel to the windings 611a to 611c, respectively. AND gates 77, 79 are similar to the AND gate 75, and are not shown in FIG. 10.

The winding 611c of the third disconnect relay 61c operates a switch 612c, which closes when winding 611c is energized, and supplies current to winding 23 of the inlet valve 14 associated with the third antilock control system from the supply line 29. This connection, also, is somewhat different from that shown in FIG. 7. To control the valves 23, 14, a power amplifier 80 is provided, as seen in FIG. 10, not shown in the circuit diagram of FIGS. 1 and 2. Power amplifier 18 includes an npn transistor 800, which has its base connected to the output terminal K43 of the OR gate 43 (FIG. 1). The collector of transistor 800 is connected to the output terminal K612 of the switch 612c. Terminal K612 also connects to the collector of a power transistor controls the outlet valve winding 25 of outlet valve 19 not shown in FIG. 10). Similar power amplifiers are connected similarly to the circuit 61a, 61b and not shown in FIG. 10 for simplicity. The emitter of the transistor 800 is connected to a series circuit formed of a resistor 801 and the winding 23 of the solenoid for the magnetic valve. A separable connector 802 is provided between the resistor 801 and the valve solenoid 23.

The emitter of the transistor 800 is further connected to the series circuit formed of a resistor 804 and a free wheeling diode 803, connected to negative bus 65. Emitter and base of transistor 800 are interconnected by a resistor 805. A resistor 806 is connected between the supply line 29 and the emitter of transistor 800.

Operation: voltage divider 743, 742 provides a voltage which is sufficiently high to transistor 740 in the switch 74 to hold the transistor 740 conductive, if the associated winding for example 611a has current flowing therethrough. Transistor 615a is supplied with base current over the emitter-collector path of the transistor 740. Let it be assumed that there is malfunction in the first antilock system (subscript a), and the first delay circuit 50 provides a 1-signal. The cathode of diode 751, as well as the emitter of transistor 740 will be at positive voltage, and transistor 615a will block. As soon as the transistor 615 blocks, transistor 740 will block since its base is now placed at negative potential. Since the trouble memory 57 retains its state, transistor 615 can no longer be supplied with base current since, on the one hand, diode 751 will be at positive voltage at all times and, further, transistor 740 will not become conductive if its emitter should be placed at negative potential from the first delay circuit 50. This ensures that a single malfunction which is sensed will cause the AND gate 75 to provide a 1-signal at its output (the junction of resistor 753, 754) even if its input terminal K50 has a 0-signal again applied.

As soon as coil 611 is de-energized, switch 612 associated therewith will drop out, and the two valves of the associated antilock system can no longer be energized.

A separable connector 802 is shown in FIG. 10, connecting the power amplifier 80 to the relay winding 23. This is necessary since, usually, the hydraulic portion is separated from the electronic portion of the antilock system. The resistor 806 permits testing for proper connection of the separable connector 802. Let it be assumed that the separable connector 802 has been disconnected. Thus, the direct connection between the emitter of the transistor 800 and winding 23 has been interrupted, and the emitter of the transistor 800 is connected to the positive line 29 over the relatively high resistor 86. Terminal K231 (FIG. 2, FIG. 10), and connected in a circuit in accordance with FIG. 10 to the emitter of the transistor 800, is thus provided, in case of an interruption of the connection, with positive voltage, which simulates for the monitor circuit the same condition, as if the magnet winding 23 would be continuously energized. Thus, the monitor circuit will go in the switching mode as if magnet winding 23 would be continuously energized, and the first delay circuit 50 will respond. If resistor 806 would not be provided, and terminal 231 would be directly connected with the magnet winding 23, the first delay circuit 50 would not respond since a continuous 0-signal would be applied thereto.

The circuits of FIGS. 9 and 10 permit disconnection of any antilock system, which develops trouble, during braking. Those antilock systems which are not affected, continue to function as before until the brake pedal is released, since the two inputs of the AND gates 77, 79 will have 0-signals applied. The circuit of FIGS. 9 and 10 is particularly suitable for the individual antilock systems of the front wheels. In case of trouble, the braking effort of the wheel in which the antilock system is inoperative does not drop so sharply. Thus, in case of malfunction, the steering difficulties, and steering forces will be less.

Various changes and modifications may be made within the scope of the invention concept; for example, the system can be applied to different types of antilock systems than those described in connection with FIG. 1, and the OR gate 53 may have additional trouble indicating circuits connected thereto, which supervise proper operation of selected circuits, components or subsystems within a vehicle wheel antilock system. Components and circuits specifically described in connection with the entire system may be used, as necessary, and in accordance with the disclosure, with any one of the embodiments described. The terminology selected herein, specifically the term "memory" has been used to characterize the specific circuits being described although, of course, the instantaneous change of state of the specific circuits may, without recourse to the memory or storage feature of the change of state,

We claim:

1. Vehicle fluid brake antilock system with a monitor and supervisory system and in which the vehicle has a starting switch (58) said system having a supply circuit (29, 65);

a brake command means (10, 11, 12) and means (27, 28, K28) sensing operation thereof;

electromagnetically controlled pressure and drain valve means (14, 19; 23, 25) respectively controlling application of pressurized brake fluid to a wheel brake (16, 17, 18) and drainage of pressurized brake fluid therefrom;

anti-lock circuit means controlling selectively energization of said valve means;

the supervisory and monitor system comprising means (50, 51, 52; 54, 55, 56) including timing means (50, 51, 52) associated with and connected to each of the antilock systems associated with separate wheels, or axles of the vehicle, and providing a trouble or malfunction signal upon sensing persistence of energization of the valve means beyond a predetermined duration;

a common trouble signal logic stage (59) and a trouble memory (57) comprising a bistable circuit, the logic stage having a logic circuit (590) connected to and controlled by said separate timing means (50, 51, 52) and the brake operation sensing means (27, 28; K28), said logic stage having a transfer function to store the trouble signal until termination of braking, as sensed by the brake operation sensing means, and then providing a disconnect signal;

the starting switch (58) being connected to the set input (S) of the bistable trouble memory circuit (57) to activate the memory upon starting of the vehicle;

connection means (53) connecting said malfunction signal providing means (50, 51, 52, 54, 55, 56) and the reset input (R) of the trouble memory (57);

the output (K57) of said trouble memory being connected to one input of said common trouble signal logic stage (59, 590); and a disconnect circuit means (60, 61; 61a, 61b, 61c) controlled by said disconnect signal, disconnecting connection of said valve means (14, 19; 23, 25) to the supply circuit (29, 65).

2. System according to claim 1 wherein said disconnect circuit means includes a disconnect stage (60); a starting switch (58) for the vehicle is provided, said disconnect stage being activated by said starting switch and being de-activated by said disconnect signal from the logic circuit.

3. System according to claim 2 wherein the disconnect stage comprises a bistable circuit (60), said starting switch (58) being connected to the set input (S) thereof and the disconnect signal derived from said trouble signal logic stage (59, 590) being connected to the reset input (R) of the bistable circuit (60).

4. System according to claim 2 wherein the disconnect circuit means further includes a disconnect relay (61) connected to and controlled by the disconnect stage (60), the controlled switch path (612) of said relay being connected in circuit with said valve means (14, 19; 23, 25).

5. System according to claim 4 further comprising an alarm indicator (613) connected to and controlled by said disconnect stage (60).

6. System according to claim 2 wherein the disconnect stage (FIG. 7; 60) comprises a disconnect transistor (600), the control relay having its control path (601) connected in series with the emitter-collector path of the disconnect transistor (600) and a switch (603) controlled by said control path (601) and connected to the control path in a self holding circuit.

7. System according to claim 6 further comprising a diode (604) connected between the control path (601) of the control relay and the starting switch (58) of the vehicle.

8. System according to claim 6 wherein the base of the disconnect transistor (600) is connected and controlled by the output of the common trouble signal logic stage (59).

9. System according to claim 6, wherein a disconnect relay (611, 612) is provided having its switching path (612) connected in series between the energization circuit for the electromagnetic valve means (14, 23; 19, 25) and its control path (611) connected in the switching circuit (603) of the control relay (601), said connection being a fail-safe connection and providing for energization of the control relay (601) affecting energization of the control path (611) of the disconnect relay and thus permit energization of said electromagnetic valve means only when the disconnect relay is not disabled.

10. System according to claim 9 wherein the switch (603) of the control relay is a transfer switch;

an alarm means (613) is provided, said alarm means being connected to the terminal of said control relay which is connected when the relay is de-energized to provide an alarm upon de-energization of the control relay and indicative of malfunction of the brake antilock system.

11. System according to claim 2 wherein the disconnect stage (60) has complementary outputs (Q1, Q2), one of said outputs (Q1) being energized upon said stage receiving a signal from said starting switch (58);

a warning indicator (613) is provided, said warning indicator being energized a. upon energization of said supply circuit and before said signal from said starting switch is received to provide an indication of operability of the warning indicator;

and b. upon change of state of said disconnect stage due to transfer of a trouble signal from said trouble signal logic circuit (59).

12. System according to claim 1 wherein the brake antilock systems of the vehicle wheels, or axles, have individual, independent tachometer generator stages (31, 32) having speed signal outputs (K321-K324); and wherein the trouble signal providing means includes a tachometer monitor stage (54), connected to said speed signal terminals and providing a speed trouble signal at an output terminal (K54) of said monitor stage if a selected characteristic of the speed signal of any one of said tachometer generator stages deviates from a predetermined characteristic;

and means (53, 57) connected to and applying said speed trouble signal to an input of said common trouble signal logic stage (59, 590).

13. System according to claim 12 wherein the predetermined characteristic is the average of the instantaneous rates of change of speed signal derived from all the tachometer generators, and a selected characteristic is an excessive variation of said rate of change of any one of the speed signals with respect to said average.

14. System according to claim 12 wherein the tachometer generator monitor stage (FIG. 4: 54) comprises a differentiator (70) and a threshold switch (71) and separate resistors (66-69) connected to the speed signals delivered from the individual wheels or axles connecting the signals, in addition, to said differentiator stage (71).

15. System according to claim 14 further comprising a coupling capacitor (717) coupling the differentiator to the threshold switch to transfer only signals representative of speed changes.

16. System according to claim 1 wherein the brake antilock systems of the vehicle wheels, or axles, have individual control memory elements (44) sensing first response of the antilock system associated with a respective wheel, or axle, and providing control signals to the valve means to control, selectively, energization thereof and hence cyclical operation of the antilock systems until reset upon release of the brake command means, as sensed by said brake operation sensing means (27, 28, K28);

and wherein the trouble signal providing means (50, 51, 52, 54, 55, 56) includes a memory monitor stage (55, 56) for at least one of said memory elements, connected to and controlled by the respective memory element (44) and the brake command sensing means (28), and providing a memory trouble signal at the output (K55, K56) thereof if the memory element of the respective antilock system does not reset upon termination of operation of the brake command means (10, 11, 12);

and means (53, 57) connected to and applying said memory trouble signal to an input of said common trouble signal logic stage (59, 590).

17. System according to claim 16 wherein the memory monitor stage (FIG. 5: 55, 56) comprises a conjunctive input gate (550, 551) and providing said memory trouble signal if the memory element has not reset upon termination of a brake command signal transmitted by said brake command sensing means (28).

18. System according to claim 17 further comprising signal delay means (553) in the monitor stage to delay the signals applied to the input thereof and thereby prevent interference between signals from the brake command sensing means (28) and the control memory (44).

19. System according to claim 1 wherein said trouble signal providing means comprises a tachometer generator monitor stage (54) providing a speed trouble signal at an output (K54) thereof, and connected to said connection means (53) to control the rest input (R) of the trouble memory (57);

a control memory monitor stage (55, 56) and providing a memory trouble signal at the output (K55, K56) thereof and connected to said connection means (53) to control the reset input (R) of the trouble memory (57).

20. System according to claim 19 wherein said brake antilock system of the vehicle has means (39) sensing vehicle speed connected to and controlled by the plurality of wheels of the vehicles, and wherein the output of said trouble memory (57) is connected to said speed sensing means (39) to disable said sensing means upon having a trouble signal from said connection means applied thereto.

21. System according to claim 20 wherein the vehicle speed sensing means (FIG. 8: 39) includes a capacitor (390) connected to be charged to a voltage simulating vehicle speed;

a disabling stage (73) connected to selectively shunt said capacitor (390) said disabling stage, upon shunting of a capacitor, providing an output signal at the output terminal thereof representative of zero vehicle speed.

22. System according to claim 1 wherein a voltage monitor stage (62) is provided, connected to and controlled by the supply circuit (29, 65) and providing a power trouble signal in case of deviation of voltage of the supply circuit from a predetermined value or range of values at an output terminal (K62) thereof;

said output terminal (K62) being connected to control disconnect circuit (60, 61; 61a -61c) upon such deviation.

23. System according to claim 22 wherein the supply circuit (29, 65) further comprises a regulated voltage supply bus (64);

and wherein a reference voltage generator (63) is provided, connected to the supply circuit (29, 65) and providing a reference voltage independent of the regulated voltage, said supply circuit (29, 65) also being connected to energize the electromagnetic valve means (14, 23; 19, 25), if controlled to be energized;

and the voltage monitor circuit (62) is connected to the regulated voltage supply bus (64) and the reference voltage generator (63).

24. System according to claim 23 wherein the reference voltage generator (FIG. 6: 63) comprises a series circuit including a Zener diode (632) and a resistor (631) connected across the supply circuit (29, 65).

25. System according to claim 23 wherein the voltage monitor stage (FIG. 6: 62) comprises two transistors (620, 621) having a common collector resistor (622) connected to both collectors of the transistors;

one transistor (620) having its emitter connected to the regulated voltage (64) and the other transistor (621) having its emitter connected to the reference voltage;

the one transistor (620) having its base connected to the reference voltage and the other transistor (621) having its base connected to the regulated voltage.

26. System according to claim 25 wherein the output terminal (K62) is connected to the common collector resistor (622);

and a delay circuit (62a) including a delay capacitor (629) connected between the collector resistor and the output terminal (K62).

27. System according to claim 22 wherein the trouble signal logic stage (FIG. 7: 59) comprises a gate (590) having an OR function and including two diodes (595, 596);

a transistor (591) connected to short circuit the output of the OR gate upon conduction thereof, the base of the transistor being connected to said voltage monitor stage (62) if the output terminal (K62) is energized upon sensing of said deviation by the voltage monitor stage and to then, short circuit the OR gate.

28. System according to claim 1 further comprising means (47, 48, 49) disjunctively connecting the electromagnetic valve means associated with the respective ones of the respective wheels, or axles to the inputs of the respective timing means (50, 51, 52), said respective timing means starting a timing period upon first energization of any one of said valve means associated with a respective wheel brake.

29. System according to claim 28 wherein the respective timing means (FIG. 3: 50, 51, 52) each include a storage capacitor (506);

means (504) slowly charging said capacitor upon first sensing energization of any one of the valve means to thereby initiate a timing interval;

and means (505, 473) rapidly discharging said capacitor upon de-energization of both said pressure and drain valve means.

30. System according to claim 1 wherein the trouble memory (FIG. 7: 57) comprises an input stage (72) including a storage capacitor (723), the input stage being activated upon energization of the starting switch (58) to hold the energization and to activate the entire supervisory and monitor system.

31. System according to claim 1 wherein the trouble signal logic circuit (FIG. 7: 59) comprises a disjunctive gate (590).

32. System according to claim 31 wherein the trouble signal logic gate comprises a gate having an OR function (590) and including two diodes 595, 596.

33. System according to claim 1 wherein the disconnect circuit means (60) includes a disconnect stage (60) and a plurality of disconnect relays (FIG. 9: 61a, 61b, 61c; 611a, 611b, 611c) for the individual antilock systems;

AND gates (75, 77, 79) for the individual antilock systems having one input connected to the trouble or malfunction signal providing means (50, 51, 52; 54, 55, 56) associated with a respective specific individual brake antilock system and having their outputs connected to the respective one of the plurality of disconnect relays associated with a specific individual brake antilock system, said AND gates (75, 77, 79) bridging said common trouble signal logic stage (59) to control the disconnect relay already in advance of the trouble signal logic stage (59).

34. System according to claim 33 further comprising a starting switch (58) for the vehicle;

a trouble memory circuit (57) connected to the starting switch and to said common trouble signal logic stage and activated upon operation of the starting switch, and de-activated upon sensing a signal being applied to said common trouble signal logic stage, said trouble memory circuit (57) having an output connected to another input of the AND gates (75, 77, 79) upon being de-activated.

35. System according to claim 34 further comprising controlled switches (74, 76, 78) in series with the circuit connecting the individual trouble or malfunction signal providing means (50, 51, 52) and respective AND gates (75, 77, 79), the state of said controlled switches being controlled by the energization of the specific one of the plurality of disconnect relays which are associated with specific brake antilock systems.

36. System according to claim 35 wherein each of the disconnect relays (FIG. 10: 61a, 61b, 61c) comprises an individual transistor (615a, 615b, 615c), said transistors being commonly energized (603) by said disconnect stage (60) if said disconnect stage is energized;

and individual relay means (611a, 611b, 611c) connected in series with the emitter-collector paths of the individual transistors, conduction of said individual transistors being separately controlled by conduction of the respective AND gate (75, 77, 79).

37. System according to claim 36 wherein the relay means comprises a relay winding (611a, 611b, 611c) and the respective AND gates (75, 77, 79) are connected to the bases of the respective transistors (615a-615c).

38. System according to claim 35 wherein each AND gate (75, 77, 79) has two inputs, one input comprising a diode (751) and the other input comprising a switching transistor (740), said transistor simultaneously forming said controlled switch;

and means connecting the base of the switching transistor (740) to the junction of the emitter-collector path of the individual transistor (6515a-615c) and the individual relay means (611a-611c) of the associated disconnect relay (61a-61c).

39. System according to claim 34 wherein each AND gate (75, 77, 79) has two inputs, one input comprising a diode (751) and the other input comprising a transistor (740).

40. System according to claim 1 further comprising a power amplifier (80) is series with the control windings (23, 25) of the valve means (14, 23; 19, 25), said amplifier including a power transistor (800) connected in series with the disconnect circuit (612a-612c) of the associated disconnect relay (61; 61a-61c).

41. System according to claim 40 wherein the collector of the power transistor (800) is connected to one terminal (29) of the supply circuit; the emitter is connected to a terminal of the respective associated control winding (23, 25) of the respective valve means (14, 19), the other terminal of said valve means being connected to the other terminal (65) of the supply circuit;

and a resistor (803) having a resistance which is high with respect to the resistance of the emitter-collector path when said transistor is conductive connected between the emitter and said one terminal (29) of the supply circuit;

and means connecting the junction of said resistor (806) and the emitter of said transistor (800) to said trouble or malfunction sensing means to provide a valve malfunction signal thereto at a voltage level of said one terminal of the supply circuit if continuity of the electrical circuit between the emitter and through the respective control winding (23, 25) of the associated valve means to the other terminal of the source (65) should be interrupted.

42. In a vehicle having individual, separate electrically controlled brake antilock systems associated with respective wheels, or axles of the vehicle, and having electrical components therein at which predetermined electrical signals arise during connection of the system and during operation thereof, a fail-safe trouble and malfunction sensing and system disconnect arrangement comprising at least one of means (50, 51, 52) connected to first selected ones of said components in the individual systems, sensing persistence of the signals thereat in excess of a predetermined time, and providing individual time malfunction signals;

means (54) connected to second selected ones of said components in the individual systems, sensing deviation of wave shape thereat from a predetermined wave shape, and providing at least one wave shape malfunction signal;

means (55, 56) connected to third selected ones of said components in the individual systems, sensing deviation of occurrence, or non-occurrence of signals from that which would arise upon proper operation of the system, and providing at least one logic malfunction signal;

means (62) connected to the system sensing deviation of characteristics of the power supply from that which would arise upon proper operation of the system, and providing a power malfunction signal;

disconnect means (60, 61) disabling said system;

and means (53, 57, 59) logically combining at least two of said malfunction signals and providing a disconnect signal, said disconnect signal being connected to said disconnect means to disable at least one of said systems when at least one malfunction signal has been received, as sensed by at least one of said malfunction means.

43. In the vehicle of claim 42, a brake operating means, and means (28) sensing operation of the brake and providing a brake operation signal upon operation of the brake, wherein said brake operation signal is connected to said logical combining means (53, 57, 59), said brake operation signal maintaining said systems in operation for the duration of brake operation, upon sensing of malfunction, and overriding said malfunction signals, except the power malfunction signal, said disconnect means being enabled upon termination of said brake operation signal, unless the malfunction signal was the power malfunction signal.

44. In the vehicle of claim 42, said power malfunction signal being connected directly to said disconnect means to immediately disable said systems.

45. In the vehicle of claim 42, said disconnect means disabling all said systems simultaneously.

46. In the vehicle of claim 42, said disconnect means comprising means (61a, 61b, 61c) selectively disconnecting the individual separate systems;

and said logical combining means comprising means (75, 77, 79) responsive to predetermined ones of said malfunction signals providing individual disconnect signals to disable only that system from which a trouble signal has been sensed, and means (57, 59, 60) to disable all said systems upon sensing of a power malfunction signal.

* * * * *